United States Patent
Grabe et al.

(10) Patent No.: US 11,327,162 B1
(45) Date of Patent: May 10, 2022

(54) METHODS OF CALIBRATING OR VALIDATING SENSORS BY USING A PLURALITY OF FIDUCIALS

(71) Applicant: Waymo LLC, Mountain View, CA (US)

(72) Inventors: Volker Grabe, Redwood City, CA (US); Andrew Crawford, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 172 days.

(21) Appl. No.: 16/793,463

(22) Filed: Feb. 18, 2020

Related U.S. Application Data

(63) Continuation of application No. 15/817,504, filed on Nov. 20, 2017, now abandoned.

(51) Int. Cl.
*G01S 7/497* (2006.01)
*G01S 17/86* (2020.01)
*G01S 17/931* (2020.01)
*G05D 1/02* (2020.01)

(52) U.S. Cl.
CPC .............. *G01S 7/497* (2013.01); *G01S 17/86* (2020.01); *G01S 17/931* (2020.01); *G05D 1/021* (2013.01)

(58) Field of Classification Search
CPC ........ G01S 7/497; G01S 17/86; G01S 17/931; G01S 19/23; G01S 19/235; G01S 7/5205; G01S 7/52004; G01S 2007/52012; G01S 2007/52014; G05D 1/021
USPC ..................... 73/1.79, 1.81, 1.82, 1.86, 1.89; 356/243.1; 367/13
See application file for complete search history.

(56) References Cited

U.S. PATENT DOCUMENTS

| | | | | |
|---|---|---|---|---|
| 4,756,472 | A | | 7/1988 | Hammons |
| 5,284,295 | A | | 2/1994 | Steinfeldt |
| 5,748,505 | A | * | 5/1998 | Greer ................... G01B 11/002 356/139.03 |
| 6,134,507 | A | * | 10/2000 | Markey, Jr ........... G01B 11/002 356/139.03 |

(Continued)

FOREIGN PATENT DOCUMENTS

EP    1376051 B1    1/2008

OTHER PUBLICATIONS

"West Marine", Available at: <https://www.westmarine.com/buy/davis-instruments-standard-echornaster-radar-reftector-P00B_246_001_513?oCode=107979&mrkgcl=481 &mrkgadid=3252486981 &rkg_id=h-27316f98d7261911e5bd5c124bc8cfff_t-1511192537 &cm_mmc=PS-_-, 1 page, submitted Nov. 20, 2017.

(Continued)

*Primary Examiner* — Robert R Raevis
(74) *Attorney, Agent, or Firm* — Botos Churchill IP Law

(57) ABSTRACT

The technology relates to fiducials for calibrating or validating a vehicle's sensors. One or more computing devices receive a plurality of data sets captured by the sensors from the plurality of fiducials. Each of the data sets corresponds to a respective sensor of the plurality of sensors. The one or more computing devices determine whether data in each of the plurality of data sets contains expected data representative of a respective fiducial of the plurality of fiducials. For each of the respective sensors, the one or more computing devices output a calibration status or a validation status associated with each data set that contains the expected data representative of the respective fiducial.

20 Claims, 15 Drawing Sheets

(56) References Cited

U.S. PATENT DOCUMENTS

| | | | |
|---|---|---|---|
| 6,155,482 | A | 12/2000 | Perry |
| 6,778,928 | B2 | 8/2004 | Stiller |
| 7,232,056 | B1 | 6/2007 | Jackson |
| 7,720,580 | B2 | 5/2010 | Higgins-Luthman |
| 8,855,370 | B2 | 10/2014 | Hoffmann |
| 2004/0164228 | A1 | 8/2004 | Fogg et al. |
| 2005/0258226 | A1 | 11/2005 | Kujawa et al. |
| 2011/0019203 | A1 | 1/2011 | Taguchi |
| 2012/0249738 | A1* | 10/2012 | Gilboa .................... G01S 7/497 348/46 |
| 2016/0295193 | A1* | 10/2016 | Van Nieuwenhove ...................... H04N 13/128 |
| 2017/0343654 | A1* | 11/2017 | Valois ..................... G01S 7/497 |
| 2018/0307238 | A1* | 10/2018 | Wisniowski ............ G01S 17/86 |

OTHER PUBLICATIONS

WIKIPEDIA, "Cat's eye (road)", Available at: <https://en.wikipedia.org/wiki/Cat%27s_eye_(road)>, retrieved on Jul. 24, 2017, 4 pages.
Wikipedia, "Retroreflector", Available at: <https://en.wikipedia.org/wiki/Retroreflector>, retrieved on Jul. 24, 2017, 10 pages.

\* cited by examiner

METHODS OF CALIBRATING OR VALIDATING SENSORS BY USING A PLURALITY OF FIDUCIALS

CROSS REFERENCE TO RELATED APPLICATIONS

The current application is a continuation of U.S. patent application Ser. No. 15/817,504, filed Nov. 20, 2017, the disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers or a remote operator may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to provide, to occupants of the vehicle, a visual indication of objects detected in the vicinity of a vehicle as well as what those objects are likely to do for some brief period into the future.

In certain circumstances such as periodically, whenever a vehicle is turned on, or after an extended period of down time, a calibration or validation needs to be performed to ensure that the sensors of the vehicle are working as intended. Such calibration and validation of these sensors may be performed by repeating a space, time, and labor intensive calibration/validation process or by manually maneuvering the vehicle while ensuring that the different sensor observations are in line with each other.

SUMMARY

This technology generally relates to a fiducial for calibrating or validating sensors. The fiducial structure may correspond to a shape of three discs placed in three perpendicular planes, with the center point of each disc lying at approximately the same point. A reflective coating may be arranged on exposed surfaces of the three metal discs.

Each of the three discs may be constructed from a corresponding single piece of metal or from two or more pieces of metal. Each of the three discs may be constructed from a conductive material. Each of the three discs are may be comprised of at least one of steel or aluminum. The three discs may have a thickness of 3 mm or more. The three discs may have a diameter of 20 cm or more.

The shape of the fiducial may be symmetric about multiple planes.

The reflective coating of the fiducial may be a solid color. The reflective coating of the fiducial may include one or more reflectors. The reflective coating of the coating is not arranged on edges of the three discs.

The fiducial may be attached to a motor and the motor may rotate the fiducial.

The fiducial may be mounted to a vehicle.

Another aspect includes a method for calibrating or validating a vehicle's sensors. The method may include receiving, by one or more computing devices, data sets, each data set including data captured by respective sensors; determining, by the one or more computing devices, whether data within the data sets contain expected data representative of a characteristic of a fiducial comprising a shape of three discs placed in three perpendicular planes, with the center point of each disc lying at approximately the same point; and outputting, by the one or more computing devices, for each of the respective sensors, a calibration or validation status based upon the determination the data within the data sets captured by the sensor contain a characteristic of the fiducial.

The may be in the shape of a cylinder or sphere

The method may include outputting, by the one or more computing devices, for each sensor, a notification based upon the determination the images within the sets of data captured by the sensor do not contain a characteristic of the fiducial.

The method may include rotating the fiducial around the vehicle's exterior, wherein the data is captured by the respective sensors as the fiducial rotates.

The method may include comparing, data within the sets of data that contain expected data captured by two or more sensors to determine if the distance of the fiducial in the data is the same; and upon determining the distance of the fiducial in the data is the same, outputting an operation status.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

Figure 1:
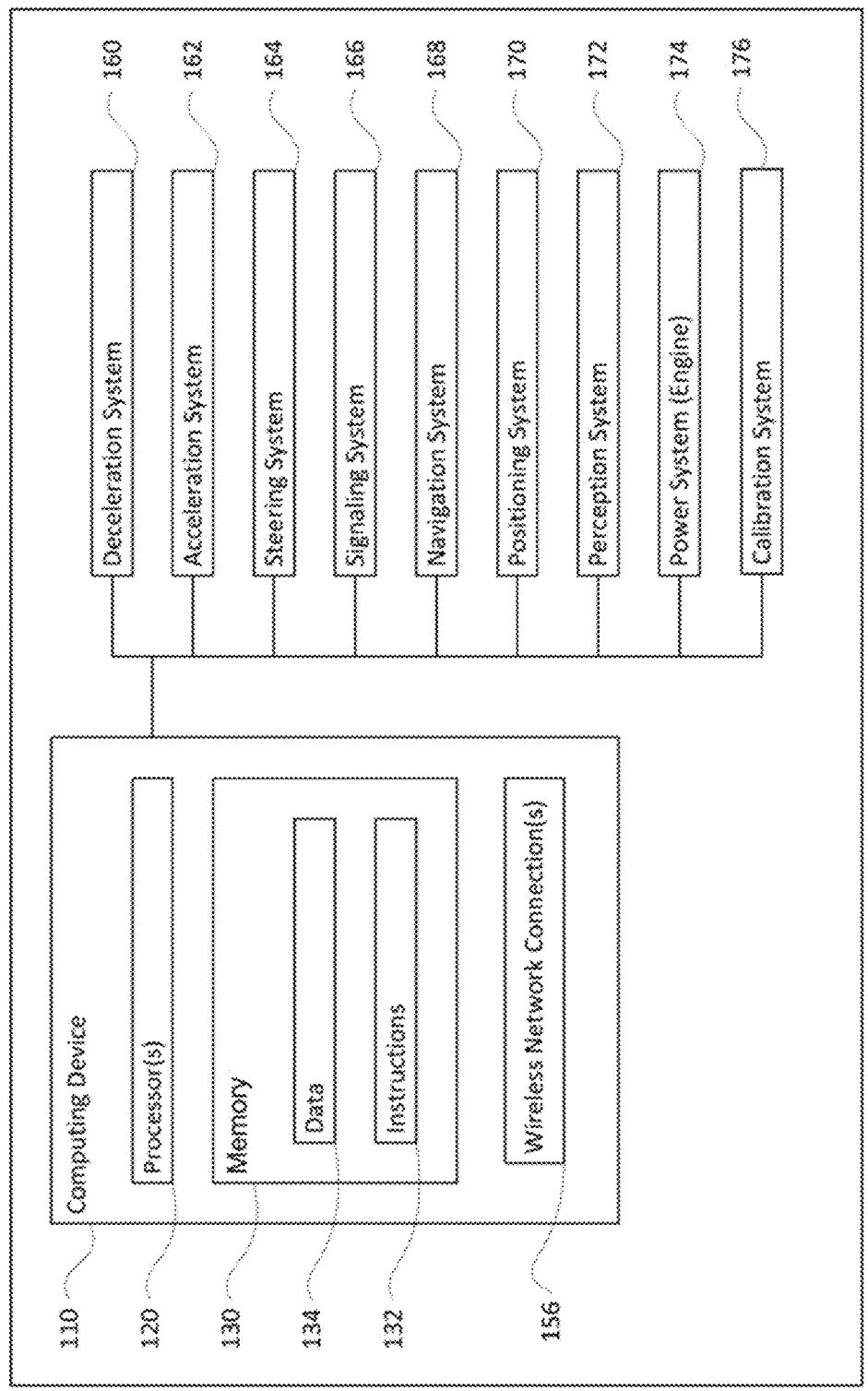
FIG. 1 is a functional diagram of an example vehicle in accordance with aspects of the disclosure.

The technology relates to a fiducial for testing the positioning and functioning of imaging sensors. Various different types of sensors that capture images using different signals may be found on a vehicle. To quickly and efficiently calibrate or validate a calibration of these sensors, a fiducial may be used.

The shape, size and materials of the fiducial may be configured to enable the different types of sensors to capture data representative of a characteristic of the fiducial. In other words, the configuration of the fiducial may be based upon the type of signals monitored by the different types of sensors of the vehicle.

The shape of the fiducial may be symmetric, constructed from three discs placed in three mutually perpendicular planes, with the center point of each disc lying at the same point. Accordingly, the shape of the fiducial is essentially that of a hollow sphere separated into eight equal segments by a shell. The eight sections may each correspond to approximately ⅛ of a sphere. The symmetrical design of the fiducial may make the fiducial rotation invariant and retroreflective.

The fiducial may be constructed from, or coated with, a metal or other conductive materials. For instance, the fiducial may be constructed from carbon fiber, a metal such as aluminum, steel, or other such material capable of reflecting wavelengths that can be received by the sensors.

The fiducial may be coated with a reflective coating to reflect large frequency ranges of the optical and near infrared frequency spectrum. In this regard, the reflective coating may be painted, glued, adhered, or otherwise positioned on the exposed surfaces of the metal. The reflective coating may include reflectors such as cat eyes, glass particles, and/or other such common reflectors. In some instances, the reflective coating may include one or more colors dependent upon the location where the fiducial will be operated to allow for easy detection of the fiducial by the sensors.

The sensors may be calibrated and/or validated to assure that the sensors are operational and positioned correctly. In this regard, each sensor may capture images of the vehicle's vicinity while the fiducial is moved and rotated around the vehicle within a line of sight of each sensor. A calibration system may analyze the captured images to determine whether the images contain expected data representative of a characteristic of the fiducial. In this regard, the calibration system may determine whether the captured images contain expected data such as the fiducial's size, shape, color, position, etc., depending upon the type of sensor which captured the images. In some instances, a sensor may determine if there is a strong intensity at the location one would be expected to see the fiducial and that the strong intensity is about the size of the fiducial. If so, the sensor may be considered to be working.

Calibration may include capturing the image space of all the sensors at in different distances. To speed up the process of capturing the image space of each sensor, multiple fiducials may be used. As described herein, the data from the captured images may be captured to determine whether they include expected data, such as the fiducial's size, shape, color, position, etc., depending upon the type of sensor which captured the images.

The features described herein allow for the calibration and validation of multiple sensors including radars, lasers, cameras, etc. By doing so, an efficient calibration and/or validation of the sensor may be performed with little to no user assistance. As such, calibration and validation of the sensors may be implemented on a large scale with minimal user assistance to allow for the efficient operation of large fleets of autonomous vehicles.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the direction and speed of the vehicle by controlling various components. By way of example, computing devices 110 may navigate the vehicle to a destination location completely autonomously using data from the detailed map information and navigation system 168. In order to maneuver the vehicle, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing devices 110 may also control the drivetrain of the vehicle in order to maneuver the vehicle autonomously. The one or more computing devices 110 of vehicle 100 may also receive or transfer information to and from other computing devices.

In one example, computing devices 110 may be an autonomous driving computing system incorporated into vehicle 100. The autonomous driving computing system may be capable of communicating with various components of the vehicle. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and calibration system 176 in order to control the movement, acceleration, speed, operation, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed and acceleration of the vehicle. For example, the acceleration system 162 may provide signals to the engine 174 to accelerate at a particular rate. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Calibration system 176 may monitor the functioning of sensors within the perception system 172. In this regard, the calibration system 176 may periodically perform a calibration or validation of the sensors to make sure they are working as intended. For instance, as described herein, the calibration system may analyze image data received from sensors to assure the sensors are positioned correctly and operating as intended. In certain instances where a full calibration is not necessary, one or more of the sensors may be individually validated to assure they are working as intended.

Calibration may include capturing the image space of each sensor. The image space may include the area within the field of vie of a respective sensor at different distances. In this regard, at least 100, or more or less, images may be required for a full calibration of the sensors. To speed up the process of capturing the image space of each sensor, multiple fiducials may be used. For validation, each sensor may capture 3, or more or less, images for processing. As described herein, the data from the captured images may be captured to determine whether they include expected data, such as the fiducial's size, shape, color, position, etc., depending upon the type of sensor which captured the images.

Figure 2A:
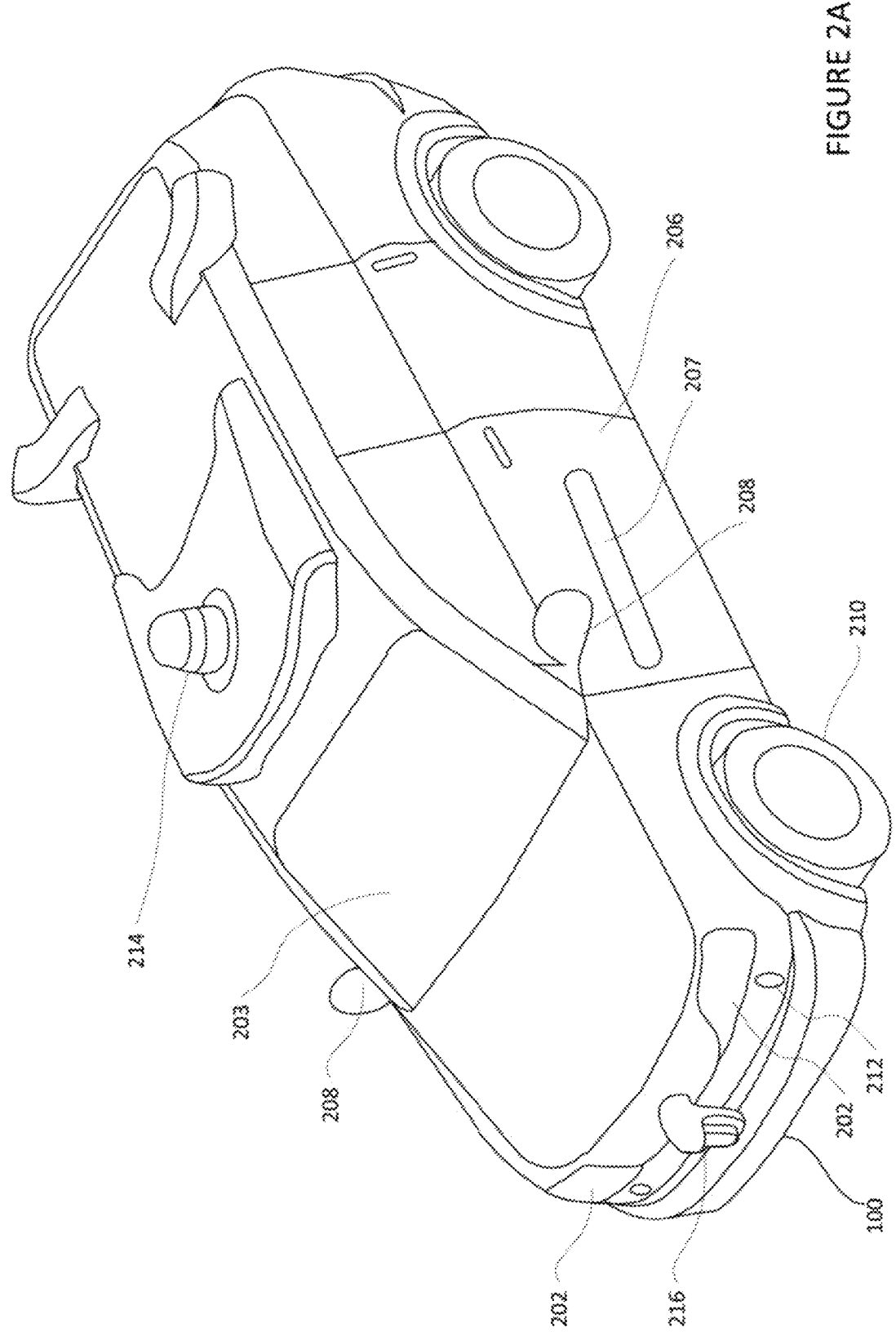
FIGS. 2A-2C are example external views of a vehicle in accordance with aspects of the disclosure.
Figure 2B:
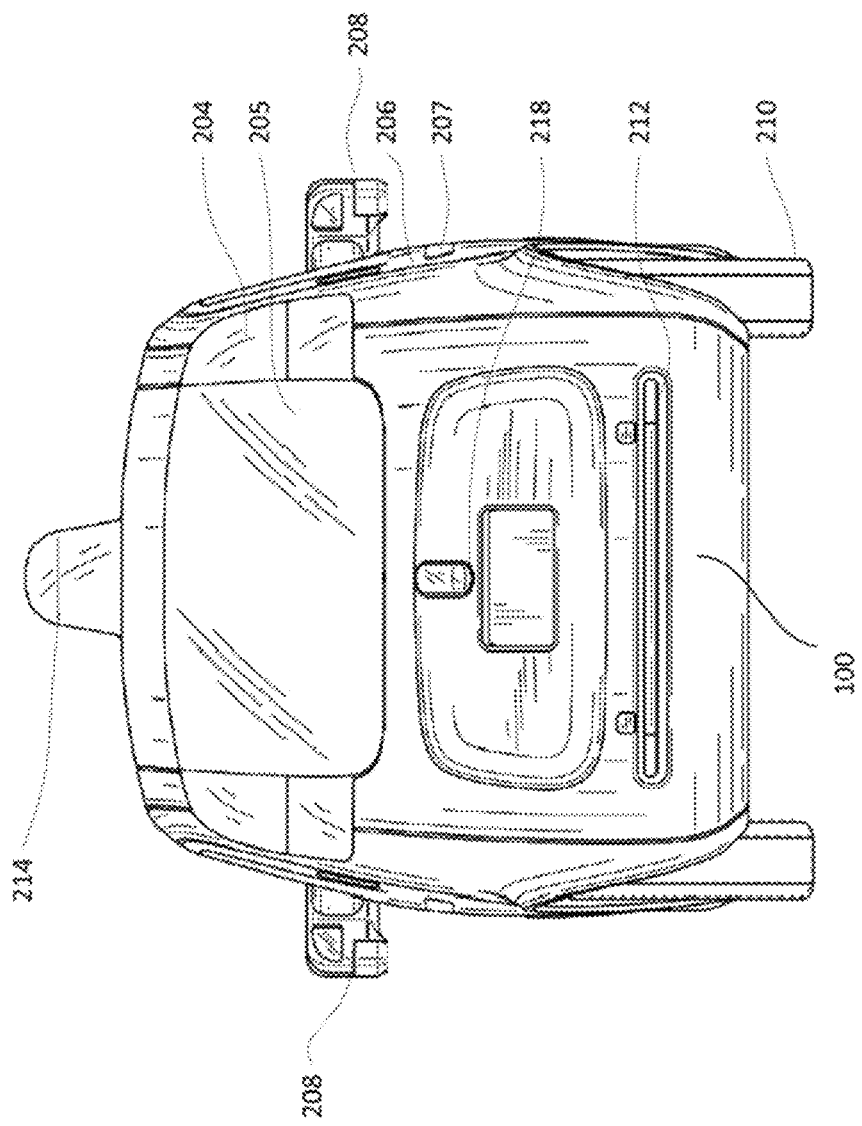
Figure 2C:
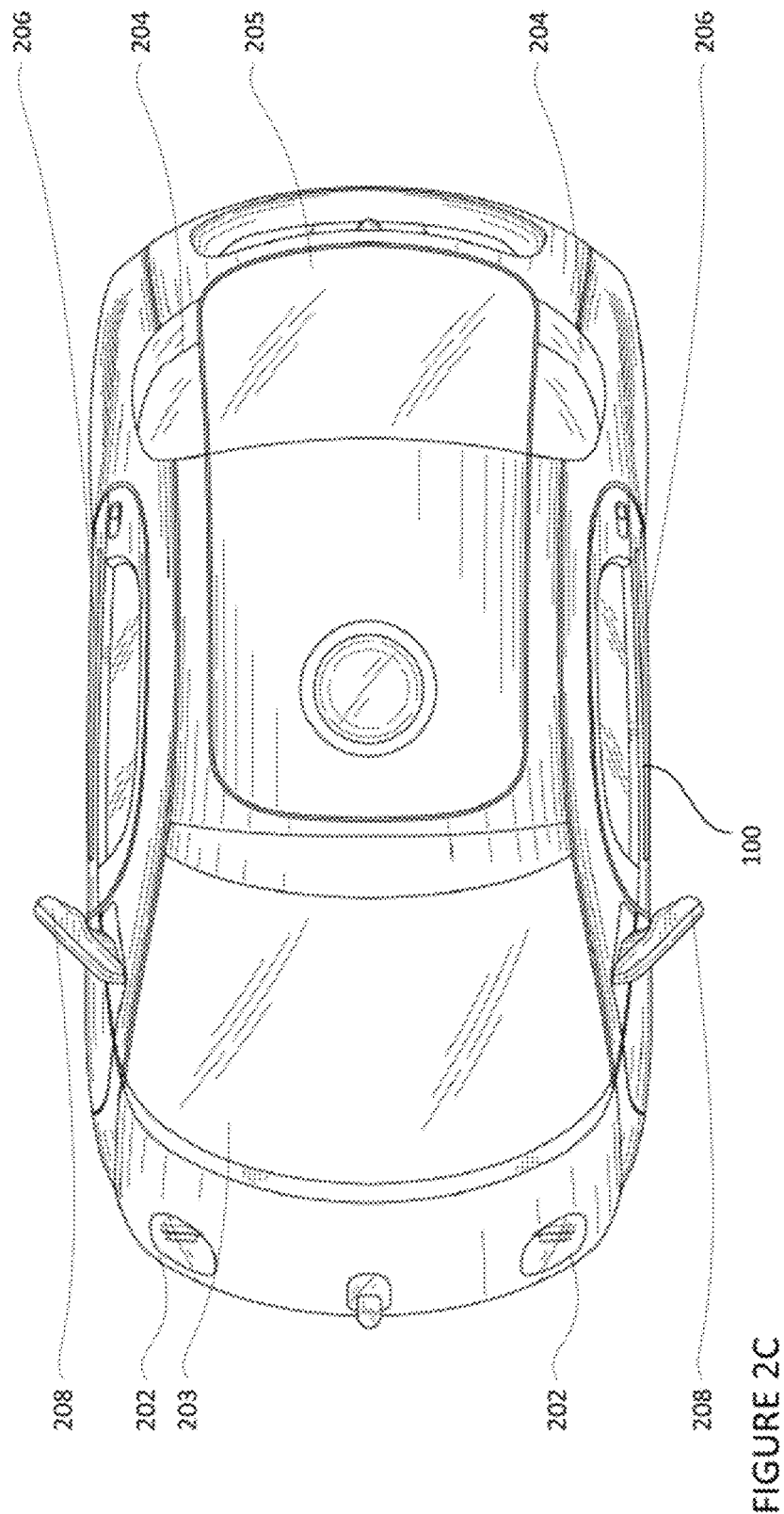

FIGS. 2A-2C are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated the signaling system 166. Light bar 207 may also be associated with the signaling system 166.

Vehicle 100 also includes sensors of the perception system 172. For example, housing 214 may include one or more laser devices for having 360 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing devices 110.

The sensors of the perception system 172 may include one or more components for detecting objects external to the vehicle such as other vehicles, obstacles in the roadway, traffic signals, signs, trees, etc. For example, the perception system 172 may include lasers, sonar, radar, cameras and/or any other detection devices that capture images and record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, radar, cameras, sonar, etc. to capture images and detect objects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices 110. Computing devices 110 may use the positioning system 170 to determine the vehicle's location and perception system 172 to detect and respond to objects when needed to reach the location safely.

Figure 3:
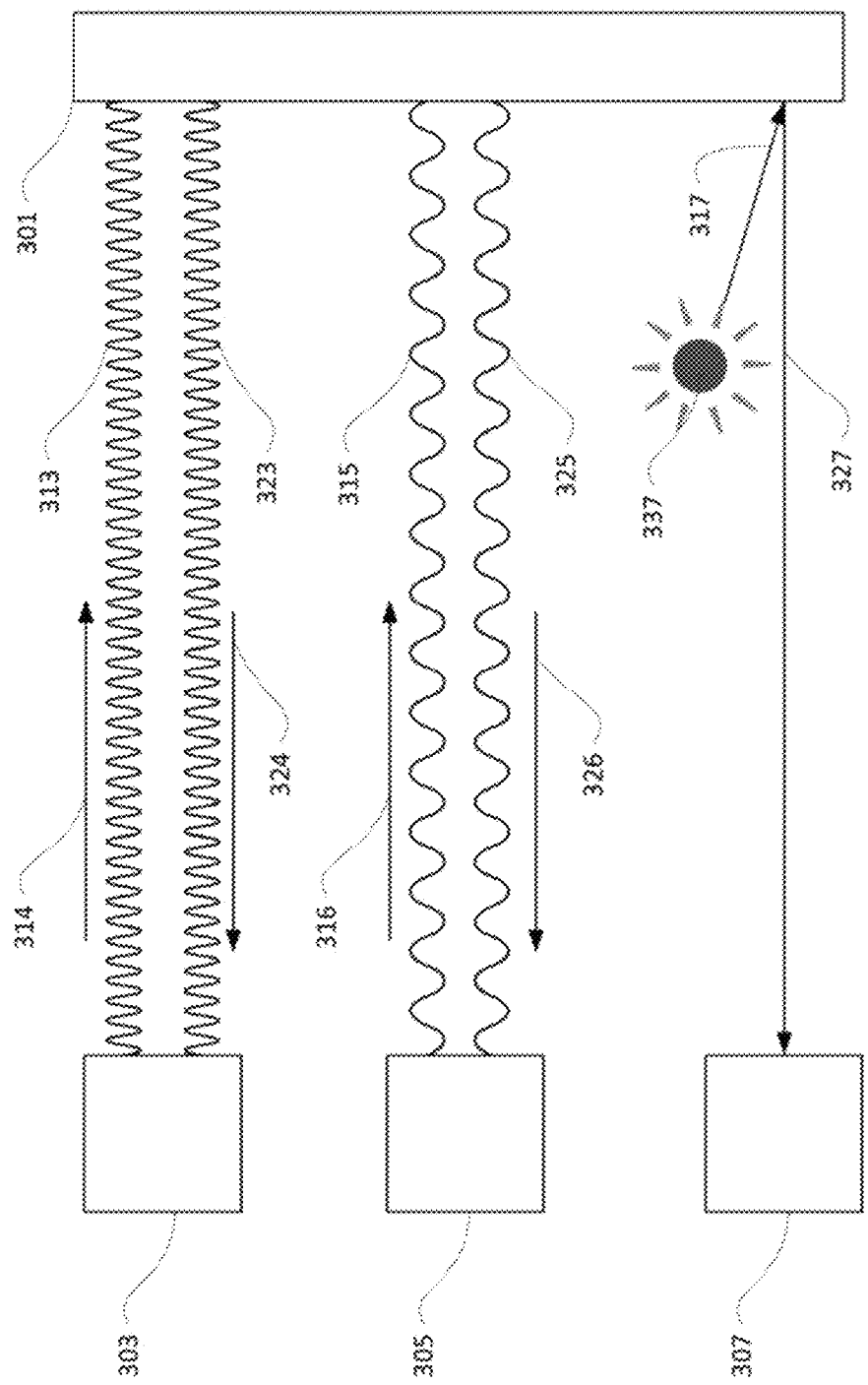
FIG. 3 is an example illustration of sensors and sensor signals in accordance with aspects of the disclosure.

FIG. 3 shows examples of sensors capturing and/or transmitting signals found within the vehicle's perception system. For instance, the vehicle's perception system may include a laser 303, radar 305, and camera 307 sensors. These sensors may each capture images and detect objects based on signals reflected off of objects, such as object 301. The camera 307 may generate an image based on the received light signals 327 which reflect off of the object 301. The received light signals 327 may be the result of a light signal transmitted from the camera, such as with a flash, or the result of ambient lighting 317 generated by a source 337 distinct from the camera reflecting off of the object 301, as further shown in FIG. 3.

In another example, laser sensor 303 and radar sensor 305 may operate by transmitting and receiving signals of particular wavelengths. For instance, laser sensor 303 may transmit a signal at a 900 nm wavelength 313, or more or less, in a first direction 314. The transmitted signal 314 is reflected off the object 301 and reflected signal 323 may travel to the laser sensor 303 in a second direction 324. Likewise, radar sensor 305 may transmit a signal at a 3 mm wavelength 315, or more or less, in a third direction 316. The transmitted signal 315 is reflected off the object 301 and reflected signal 325 may travel to the radar sensor 305 in a fourth direction 326. The radar and laser sensors may then generate image data from the received signals.

To calibrate or validate the sensors to assure the sensors are functioning properly, a fiducial may be used. In this regard, calibrations or validations may be performed periodically, when the vehicle is turned on, or after a period of down time. However, calibration or validation may be performed more or less frequently. Furthermore, although the sensors are discussed herein with regard to the perception system 172, the sensors may be part of any component of the vehicle 100 which utilizes sensors such as the laser sensor 303 and radar sensor 305 discussed above.

The fiducial may be configured to enable the different types of sensors to capture data representative of a characteristic of the fiducial. In other words, the configuration of the size, shape, and materials of the fiducial may be based upon the type of signals monitored by the different types of sensors of the vehicle.

Figure 4B:
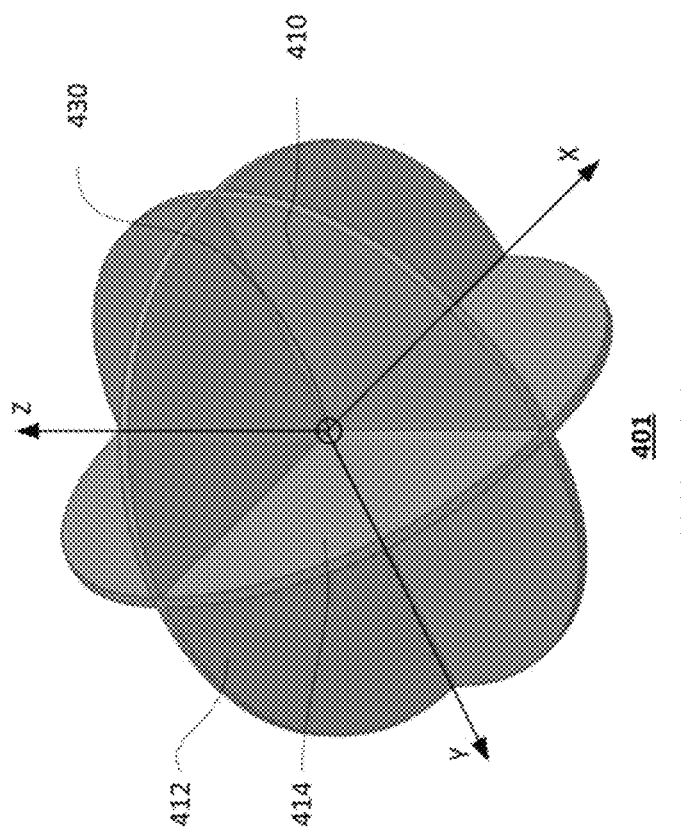
FIGS. 4A and 4B are example illustrations of perspective views of a fiducial in accordance with aspects of the disclosure.
Figure 4A:
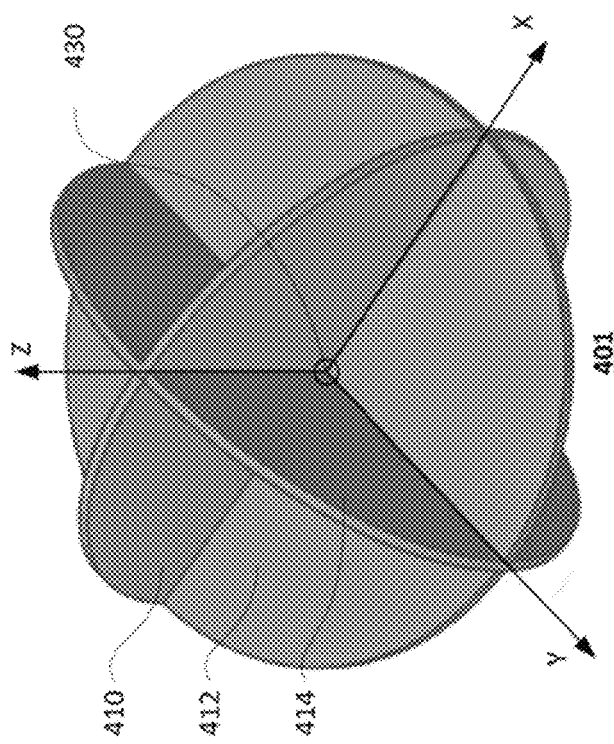

The shape of the fiducial may be that of three discs placed in three mutually perpendicular planes, with the center point of each disc lying at the same point. For instance, as shown in FIG. 4, fiducial 401 may include three discs 410, 412, and 414 which share a common center point 430. Each disc 410, 412, and 414 of the fiducial 401 may lie on one of the three perpendicular planes of (x, z), (x, y), and (y, z), respectively. As such, the shape of the fiducial is essentially that of a hollow sphere separated into eight equal segments by a metal shell. In other words, the overall shape of the fiducial may thus correspond to three discs each arranged approximately perpendicularly to each of the other two discs such that each of the discs has a common center point and divides an imaginary sphere into two hemispheres.

Figure 5B:
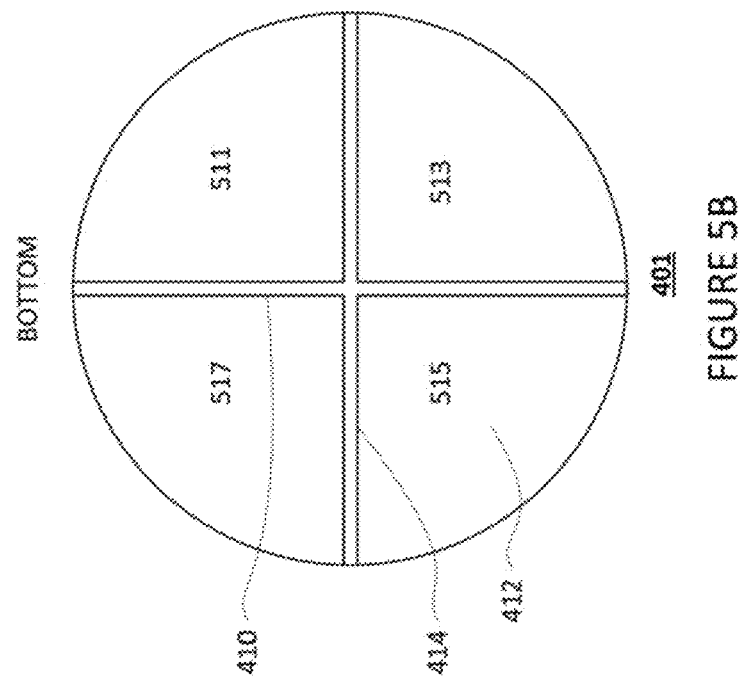
FIGS. 5A and 5B are example illustrations of top and bottom views of a fiducial in accordance with aspects of the disclosure.
Figure 5A:
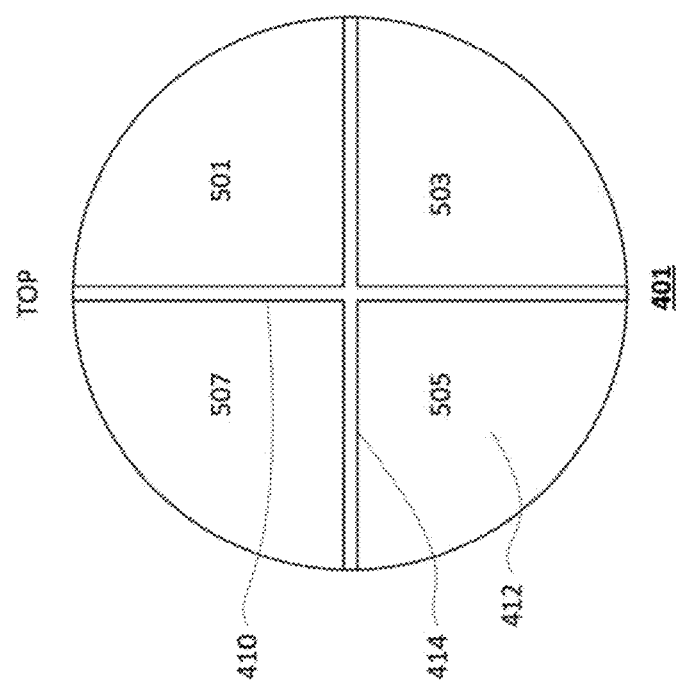

Thus the sphere is divided into 8 sections each corresponding to approximately ⅛ of a sphere, as shown in FIGS. 5A and 5B. In this regard, when the fiducial viewed from the top, as shown in FIG. 5A, discs 410, 412, and 414 may separate the fiducial into four sections 501, 503, 505, and 507. When viewed from the bottom, as shown in FIG. 5B, discs 410, 412, and 414 may separate the fiducial into another four sections 511, 513, 515, and 517.

This shape of the fiducial may be achieved using a welding process, a molding process, three-dimensional printing, etc. In addition or alternatively, a first disc may be formed from a single sheet of metal, a second disc may be formed from two approximately "half-discs" (corresponding to approximately 180 degree portions of the first disc) arranged on opposing sides of the first disc, and a third disc may be formed from four approximately "quarter-discs" (corresponding approximately to 90 degree portion of the first disc) arranged on opposing sides of each of the half-discs of the second disc. For clarity, the description of the shape of the fiducial 401 does not take into account the thickness of the metal. Further, although the shape of the fiducial 401 is described as being that of three discs 410, 412, and 414 placed perpendicular and sharing a center point, the fiducial may be comprised of single piece of metal or more than one piece of metal connected together. The thickness of the discs may be 3 mm or more or less.

Figure 6A:
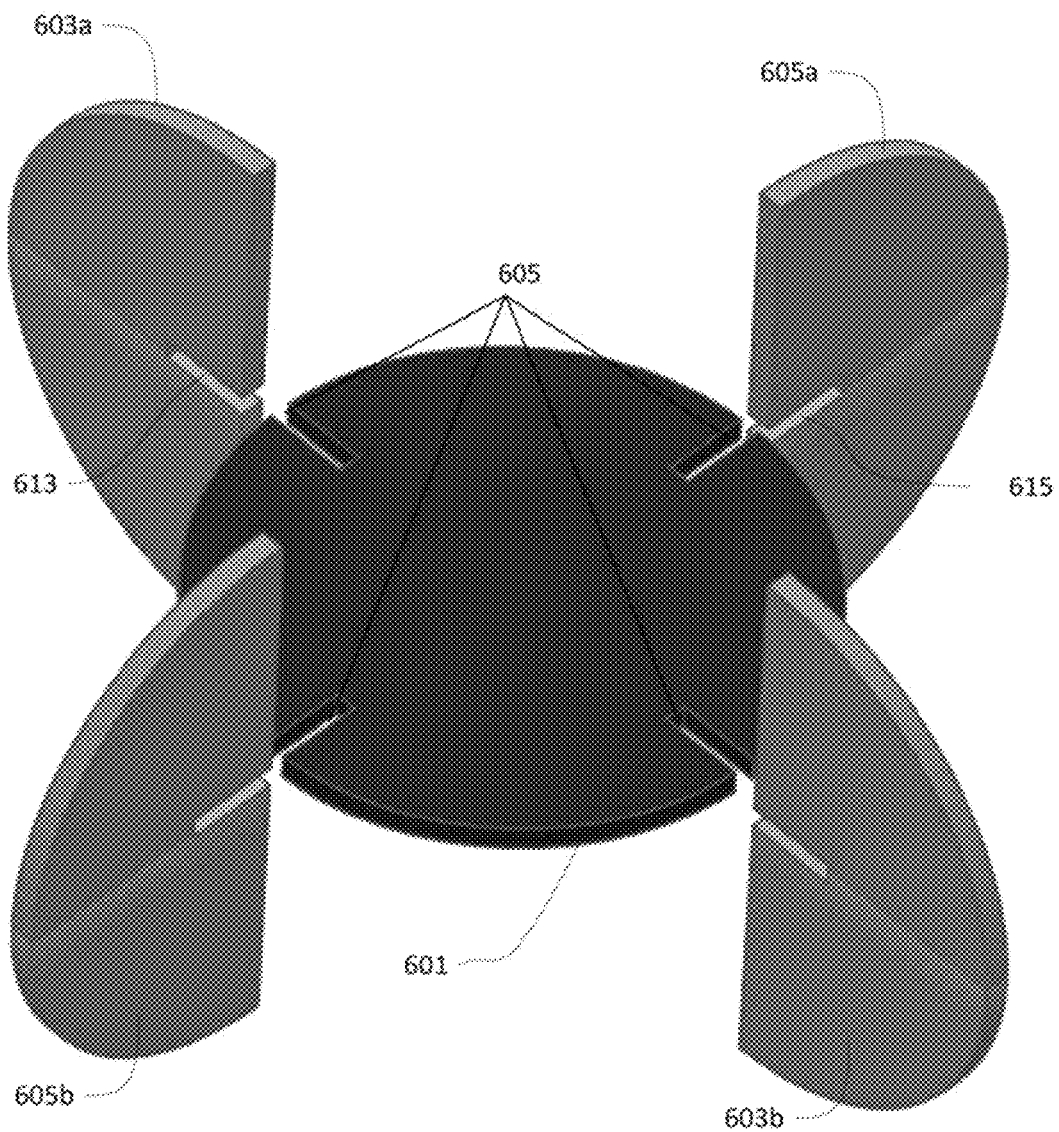
FIGS. 6A and 6B are example illustrations of components of the fiducial in accordance with aspects of the disclosure.
Figure 6B:
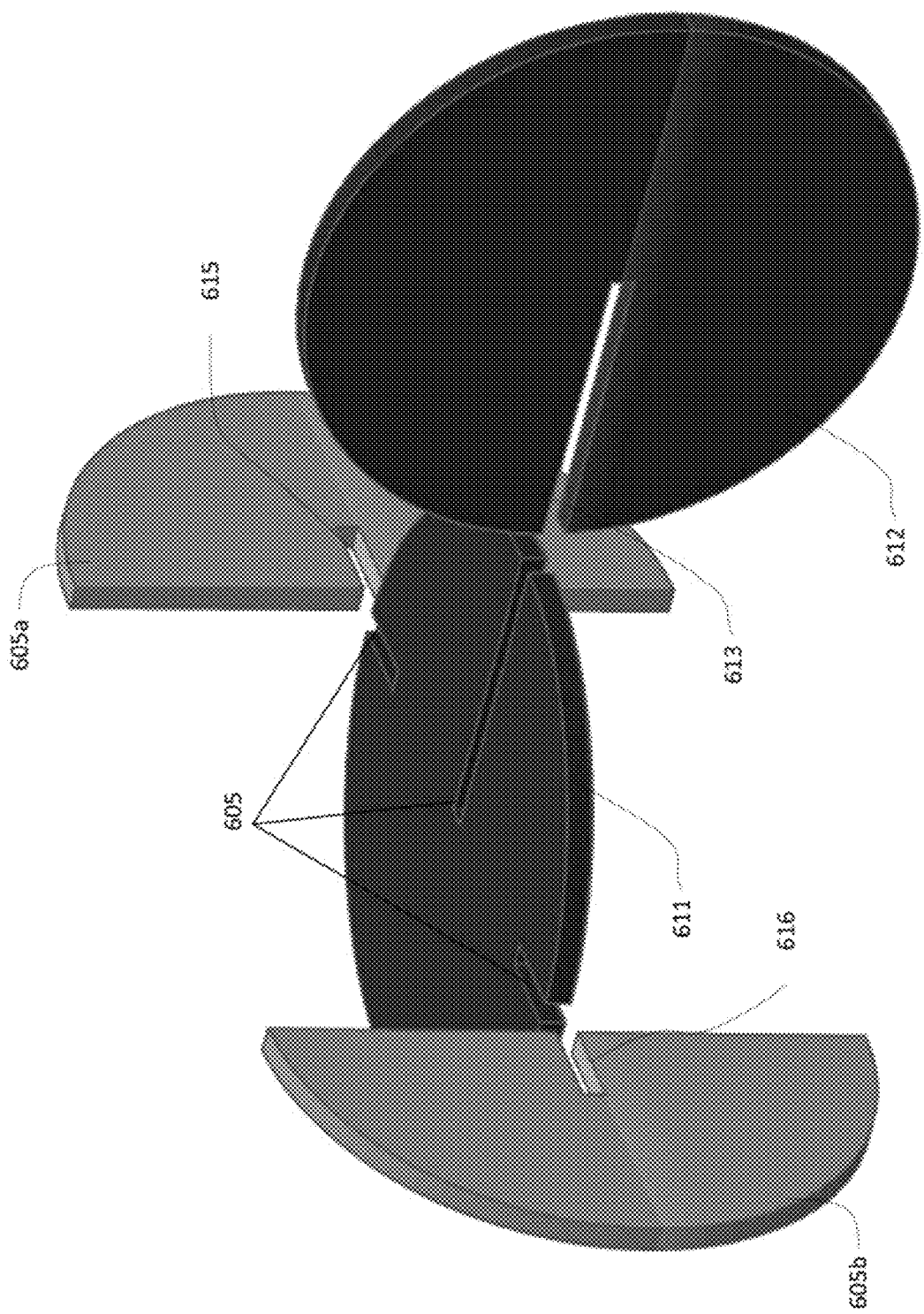

For instance, as shown in FIG. 6A, the first disc 601 may be formed from a single sheet of metal and the second and third disc may each be formed from two half discs 603*a-b* and 605*a-b*, respectively. The first disc may include four cutouts into which corresponding cutouts on the half discs, such as cutouts 613 and 615, on half discs 603*a* and 605*a*, respectively, may be positioned such that the flat sides of the half discs contact each other at the midpoint of the first disc. The half discs 603*a-b* and 605*a-b* may be glued or welded together and also glued or welded to disc 601. In another instance, the first disc 601 and the second disc 612 may each be formed from a single sheet of metal and the third disc may be formed from two half discs 605*a-b* as shown in FIG. 6B. The first disc may include three cutouts 605 into which corresponding cutouts 615 and 616 on the two half discs 605a-b and cutout 613 on the second disc may be positioned. The half discs 605a-b may then be welded, or otherwise attached to the first and second discs.

The shape of the fiducial may be symmetric. In this regard, each disc of the fiducial may be the same size, such as a diameter of 20 cm or more or less. The symmetrical design of the fiducial, such as fiducial 401 makes the fiducial rotation invariant and retroreflective. The rotation invariance of the fiducial allows the fiducial to be detected by all sensors regardless of its orientation, as signals reflected off the fiducial are directed back in the direction from which they came as long as the wavelength of the signal being reflected is less than half the diameter of a disc (i.e., the radius of a disc) of the fiducial. The size of the fiducial may be larger than the largest wavelength of a signal which it is to reflect. As such, all signals may be reflected off of the fiducial. The retroflectivity of the fiducial 401 allows the fiducial to reflect high frequency wavelength signals transmitted from the sensors back in the direction from which they came.

The fiducial 401 may be constructed, or coated with, a conductive material such as metal (e.g., aluminum, steel, or other such metal), capable of reflecting wavelengths that can be received by the sensors, such as the radar sensor 305. In this regard, the metal or other conductive material may operate as a retro-reflector to radar signals. To increase reflectivity of the fiducial 401, a polished metal may be used. In some instances, the fiducial may be constructed from other materials, such as plastics (e.g., PVC), or woods. These other materials may be coated or covered with a conductive material, such as aluminum foil to make the fiducial operate as a retro-flector.

Figure 7:
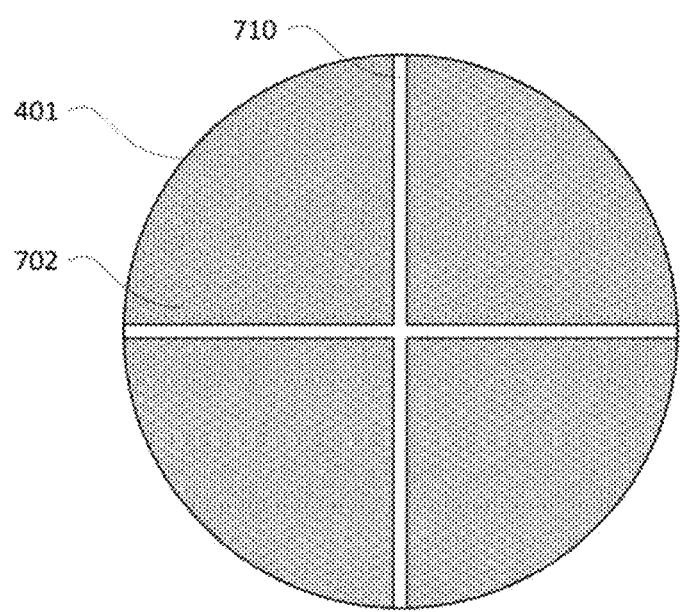
FIG. 7 is an example illustration of a coating on a fiducial in accordance with aspects of the disclosure.

The metal may be coated with a reflective coating. In this regard, the reflective coating may be painted, glued, adhered, or otherwise positioned on the exposed surfaces of the metal. For example, as shown in FIG. 7, the exposed surfaces of the fiducial 401 are coated with the reflective coating 702, while the edges 710 of the fiducial remain free from the reflective coating. In some instances the edge of the fiducial may also be coated with the reflective coating.

The reflective coating 702 may include reflectors such as cat eyes, glass particles, and/or other such reflectors. The reflectors may be configured to reflect large frequency ranges of the optical and near infrared frequency spectrum. For instance, the reflectors may be designed to reflect near infrared wavelengths of a laser sensor, such as a wavelength of around 900 nm, or more or less. In another example, the reflector may be designed to reflect visible wavelengths observable by a camera, such as wavelengths of 390 to 700 nm, or more or less.

The reflective coating may also include one or more colors, such as orange, red, blue, green, etc. The color of the reflective coating 702 may be dependent upon the location where the fiducial will be operated. In this regard, a bright color, such as orange may be used to assure that the fiducial can be easily detected in camera images relative to other background colors in the camera images.

Figure 8A:
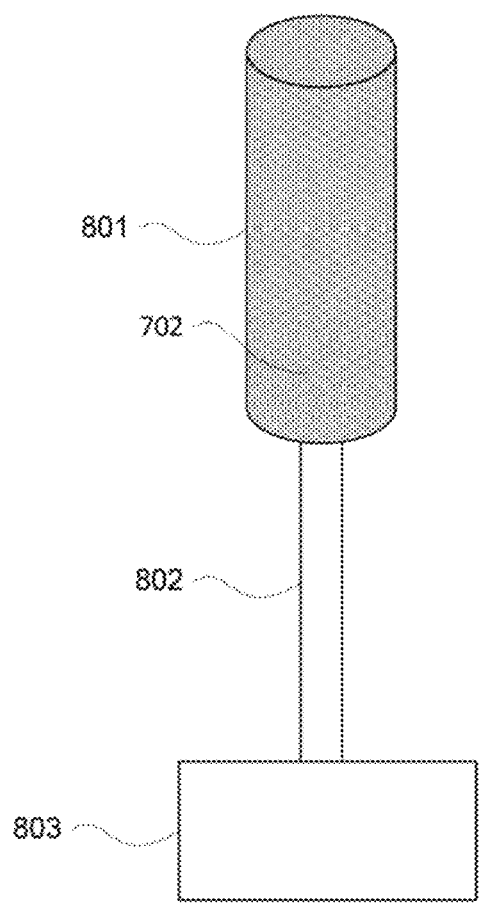
FIGS. 8A and 8B are example illustrations of alternative shapes of a fiducial in accordance with aspects of the disclosure.
Figure 8B:
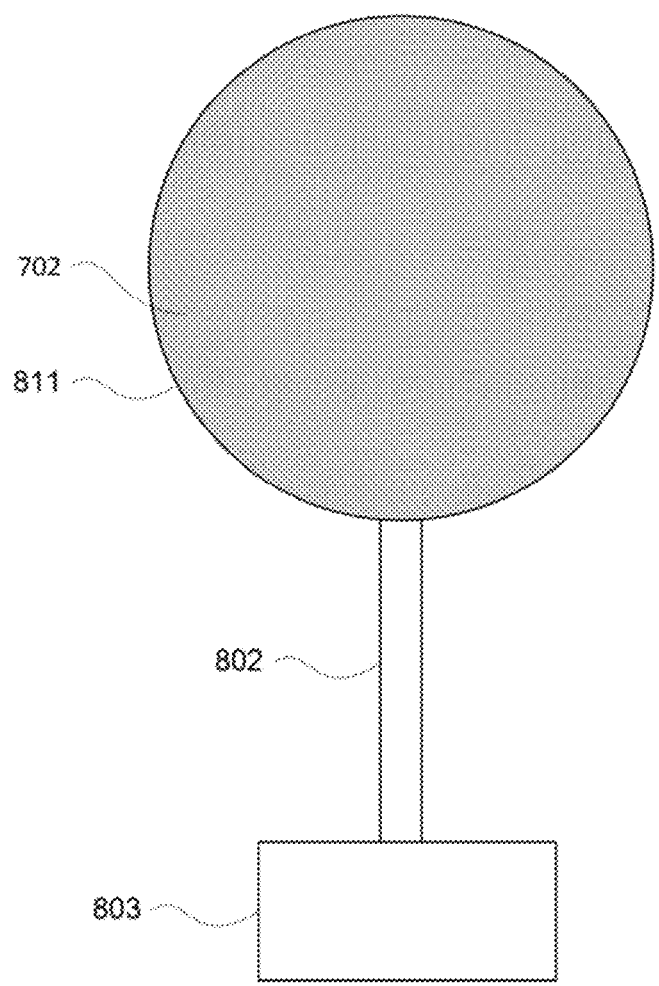

In some instances the fiducial may be configured in the shape of a cylinder or sphere. For instance, as shown in FIG. 8A, the fiducial 801 may be configured as a closed cylinder. In some instances the cylindrical fiducial may be an open, or partially opened cylinder. In this regard, one or both of the top and bottom of the cylindrical fiducial 801 may be open. Another fiducial 811 may be configured as a sphere, as shown in FIG. 8B.

As with fiducial 401, cylindrical fiducial 801 and spherical fiducial 811 may be constructed or coated with, a conductive material such as metal (e.g., aluminum, steel, or other such metal,) capable of reflecting wavelengths that can be received by the sensors, such as the radar sensor 305. For instance, cylindrical fiducial 801 may be constructed from a hollow-cylindrical piece of PVC. The cylindrical PVC may be coated with a conductive material, such as aluminum foil. Similarly, spherical fiducial 911 may be constructed from a molded piece of plastic painted with a conductive paint.

The height and width of the cylindrical fiducial may be 25 cm×10 cm-20 cm, or more or less. The diameter of the spherical fiducial may be between 15 cm and 20 cm, or more or less. The size (e.g., height, width, diameter, etc.,) of the fiducials may be dependent upon the wavelengths used by the sensors being calibrated and/or validated as described herein.

The cylindrical and spherical fiducials may be coated or otherwise covered with a reflective coating, as described herein. In this regard, the reflective coating may be painted, glued, adhered, or otherwise positioned on the exposed surfaces of the conductive material. For example, as shown in FIGS. 8A and 8B, the surfaces of fiducials 801 and 811 are coated with the reflective coating 702.

Figure 9:
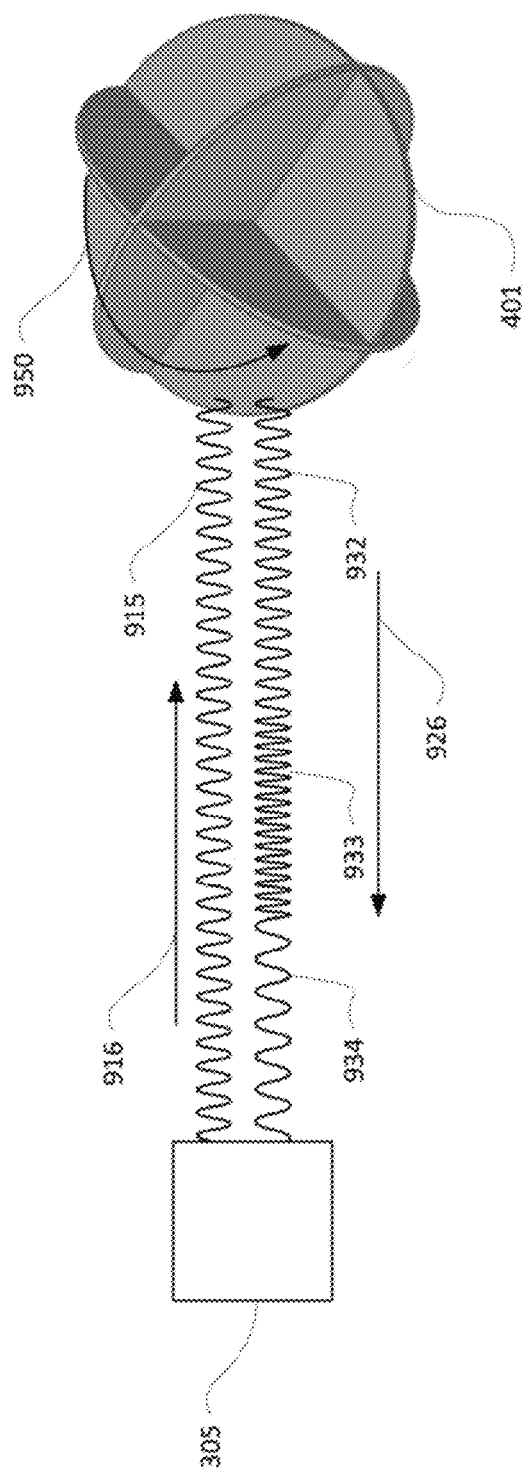
FIG. 9 is an example illustration of the Doppler Effect caused by rotating the fiducial in accordance with aspects of the disclosure.

The fiducial may be rotated in order to generate a Doppler effect on the reflected signals. In this regard, as the fiducial rotates, the wavelength of the reflected signal may increase as the portion of the fiducial which the signal is reflecting off of is moving towards the sensor and decrease as the portion of the fiducial which the signal is reflecting off of is moving away from the sensor. For example, as shown in FIG. 9, the fiducial 401 may be rotated in a first direction 950 via a motor or other such device (not shown). The signal 915 transmitted from the sensor, such as radar sensor 305 in a first direction 916 may be reflected off of the fiducial 401 in a second direction 926. The rotation of the fiducial 401 causes the wavelength of the reflected signal to increase and decrease depending upon whether the signal is reflected off a portion of the fiducial moving toward the radar sensor 305 or away from the radar sensor 305, respectively. Accordingly, the reflected signal may include multiple portions with different wavelengths, such as portions 932, 933, and 934.

Example Methods

Calibration and/or validation of the sensors may assure that the sensors are operational and positioned correctly. In this regard, the fiducial or more than one fiducial may be positioned in the vicinity of the vehicle such as by being suspended on a mount, string, or other such support at a height and/or position relative to the vehicle. For instance, the fiducial may be suspended from a ceiling or wall of a building, such as a parking garage where the vehicle parks. In certain instances, the fiducial may be suspended from a support, such as a pole, attached to the vehicle. For instance, referring again to FIGS. 8A and 8B, the fiducials 801 and 811 may be mounted to a pole 802 supported by a base 803. Although FIGS. 8A and 8B show the pole 802 being mounted below the fiducials, the pole 802 may be attached anywhere on the fiducials. Moreover, the pole may be attached directly to a support other than a base 803, such as a wall, or not attached to any support.

The height and/or position the fiducial is mounted relative to the vehicle may be based upon needs derived from the sensors being calibrated and/or validated. As discussed herein, a vehicle's perception system may use various sensors, such as LIDAR, radar, cameras, sonar, etc. which capture and detect objects at different locations. The height and/or position of the fiducial may be such that the sensor or sensors to be calibrated can detect the fiducial or fiducials.

Figure 10:
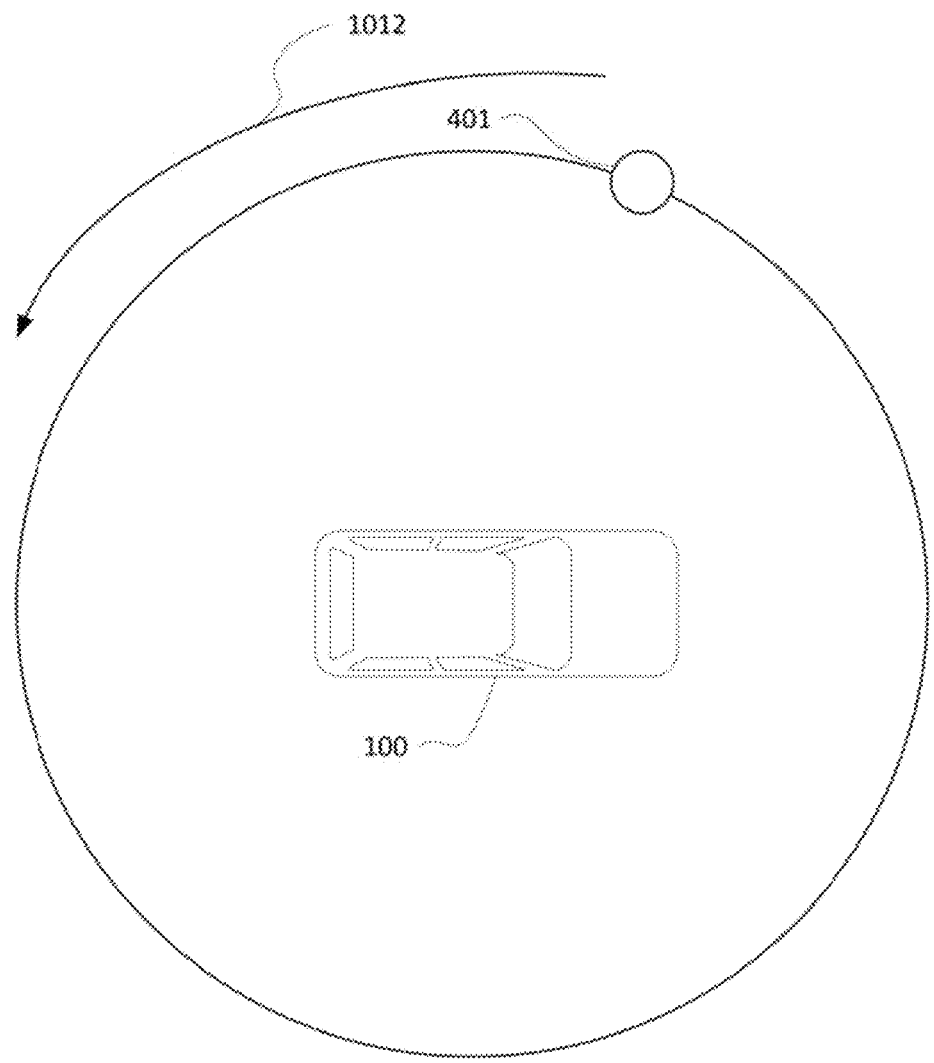
FIG. 10 is an example illustration of calibrating sensors in accordance with aspects of the disclosure.

The fiducial may be rotated around the vehicle to allow each sensor to capture images of the fiducial. In this regard, each sensor may capture images of the vehicle's vicinity while the fiducial 401 is rotated around the vehicle 100 in a first direction 1012 within a line of sight of each sensor, as shown in FIG. 10. In some instances, the fiducial may make multiple rotations around the vehicle 100 in the first direction 1012, or in an opposite direction. In certain instances, multiple fiducials may be placed around the vehicle, thereby allowing each sensor to view one or more fiducials at the same time.

One or more fiducials may be positioned at predetermined locations relative to the path of a vehicle such that they may be captured by one or more of the vehicle's sensors. In this regard, a set of fiducials may be spread out and mounted along a vehicle's path, such as inside the vehicle's parking garage to allow for daily, or more or less, calibration and/or validation of the vehicle's sensors. For instance, each sensor may capture images of the vehicle's vicinity while the vehicle travels along the path. Based upon the position of each fiducial and the field of view of each sensor, particular fiducials may only be captured by a subset of the sensors. As such, fiducials may be strategically positioned such that they are within the field of view of a particular sensor(s) of the vehicle. In some instances the vehicle may stop at a predetermined spot relative to one or more of the fiducials to allow for the sensors to capture images of the one or more fiducials at a particular position. Other locations where the fiducial may be positioned include parking structures, such as at the entrance, exit, or other location within the parking structure, in public spaces highly frequented by the vehicle, such as an intersection or public transportation drop-off/pick-up zone, etc.

Images captured by the sensors may be analyzed to determine whether the sensor which captured the respective image is functional and positioned correctly. In this regard, sets of images (i.e., data sets) captured from one or more of the vehicle's sensors may be analyzed to determine whether images in the sets of images contain expected data representative of a characteristic of a fiducial. The retro-reflection properties of the fiducials may cause a return signal that includes intensity values which stand out from the background and other objects in the captured scene. Thus, the image captured by an image sensor (i.e., captured data) may be analyzed to determine whether the return signal includes at least a threshold level of intensity values is met. For instance, an image captured by a camera may be analyzed using photo processing techniques, such as color and/or shape segmentation, to determine if the image contains data including expected intensity values associated with the one or more fiducial's colors. The image may also be analyzed to determine if the image contains expected data of the one or more fiducials at a particular location, such as at a certain height. If so, the camera sensor may be considered to be working and positioned correctly. Otherwise, the sensor maybe considered being non-operational and a notification may be provided to an occupant of the vehicle or transmitted to another system.

In another example, a radar and/or laser sensor may transmit signals in the direction of where the fiducial should be positioned and receive reflected signal. The received signals may be analyzed, such as by the calibration system 176 to determine if there is a strong intensity at the location one would be expected to see the fiducial and that the strong intensity is about the size of the fiducial. If so, the laser and/or radar sensor may be considered to be working and the status of the sensor may be termed operational. In the event the fiducial is being rotated, the radar sensor may determine the location of the fiducial based on receipt of a signal displaying characteristics of the Doppler Effect.

Images captured by two or more sensors may be compared to determine if the distance of the fiducial is the same. If so, the calibration system may determine the two sensors are positioned correctly and term the two or more sensors as operational.

In some instances, the calibration system may trigger adjustments and/or corrections of non-operational, misaligned, or otherwise malfunctioning sensors. For instance, the calibrations system may send adjustment signals which cause non-operational sensors to reposition or adjust operations to correct sensor issues.

Figure 11:
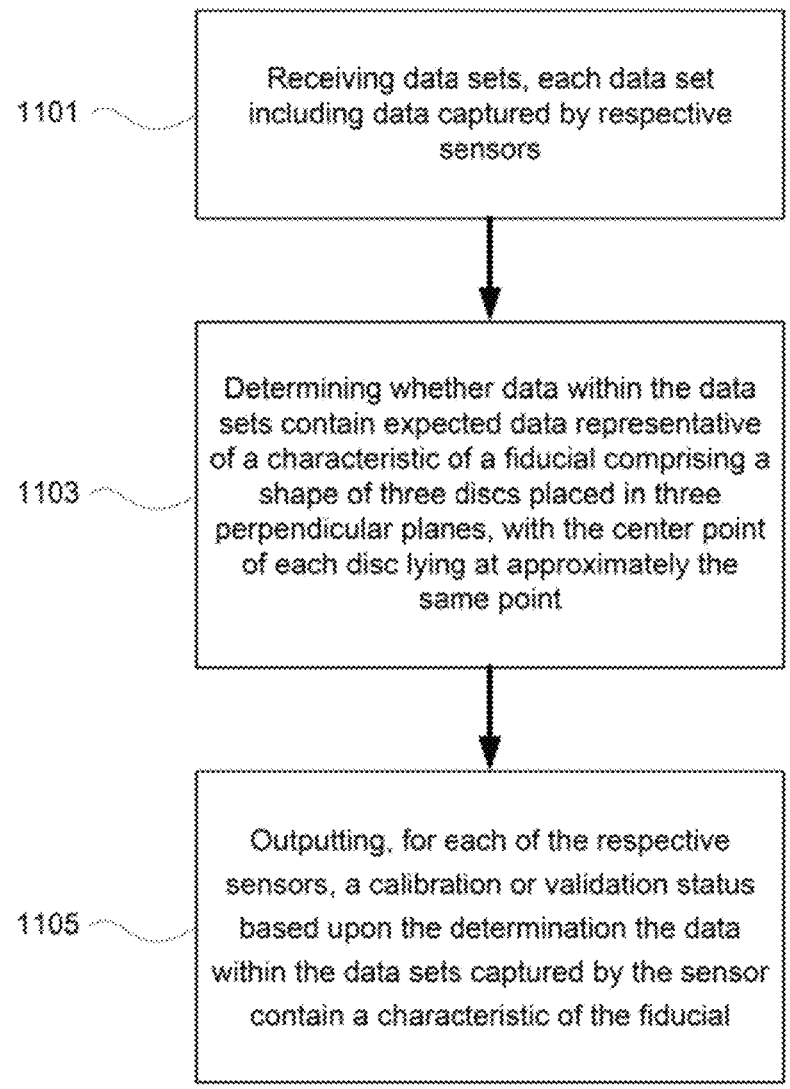
FIG. 11 is an example flow diagram in accordance with aspects of the disclosure.

FIG. 11 is an example flow diagram 1100 including a method for calibrating and/or validating sensors, in accordance with some of the aspects described above. For example, at block 1101, data sets are received, by one or more computing devices, each data set captured by respective sensors. A determination whether data within the data sets contain expected data representative of a characteristic of a fiducial comprising a shape of three discs placed in three perpendicular planes, with the center point of each disc lying at approximately the same point is made, as shown in block 1103. For each sensor, an operational status is output based upon the determination the data within the data sets captured by the sensor contain a characteristic of the fiducial, as shown in block 1105.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding components do not have to be arranged in the precise order described above. Rather, various components can be arranged in a different order, such as reversed. Components can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of calibrating or validating a plurality of sensors by using a plurality of fiducials, the method comprising:

receiving, by one or more computing devices, a plurality of data sets captured by the sensors from the plurality of fiducials, wherein each of the data sets corresponds to a respective sensor of the plurality of sensors;

determining, by the one or more computing devices, whether data in each of the plurality of data sets contains expected data representative of a respective fiducial of the plurality of fiducials, wherein the respective fiducial is rotated by a motor attached to the respective fiducial; and for each of the respective sensors, outputting, by the one or more computing devices, a calibration status or a validation status associated with each data set that contains the expected data representative of the respective fiducial.

2. The method of claim 1, wherein the plurality of sensors are mounted on a vehicle traveling along a path, and
wherein the fiducials are positioned at predetermined locations relative to the path of the vehicle such that the data sets are captured by the plurality of sensors.

3. The method of claim 1, wherein the respective fiducial is a cylindrical fiducial or a spherical fiducial.

4. The method of claim 1, wherein the respective fiducial is coated or covered with a reflective coating.

5. The method of claim 1, further comprising rotating the respective fiducial to generate a Doppler effect on a reflected signal, wherein a wavelength of the reflected signal increases as a portion of the respective fiducial that that the signal is reflecting off of is moving towards the respective sensor, and decreases as the portion of the respective fiducial which the signal is reflecting off of is moving away from the respective sensor.

6. The method of claim 5, wherein the reflected signal includes multiple portions with different wavelengths.

7. The method of claim 1, wherein at least one of the plurality of sensors is a camera that captures an image, wherein the one or more computing devices analyze the image to determine whether the image includes data indicating expected intensity values associated with one or more colors of the respective fiducial.

8. The method of claim 7, wherein the one or more computing devices compare images captured by two or more of the plurality of sensors to determine if a distance between the sensors and the respective fiducials is the same.

9. A method of calibrating or validating a plurality of sensors by using a plurality of fiducials, the method comprising:
transmitting, by the plurality of sensors, a plurality of signals to the plurality of fiducials;
capturing, by the plurality of sensors, a plurality of images transmitted by the plurality of sensors in response to the plurality of signals,
wherein the images include a plurality of data sets that correspond to respective fiducials of the plurality of fiducials;
determining, by the plurality of sensors, whether data in each of the plurality of data sets contains expected data representative of a respective fiducial of the plurality of fiducials, wherein the respective fiducial is rotated by a motor attached to the respective fiducial; and
outputting, by each respective sensor of the plurality of sensors, a calibration status or a validation status associated with each data set that contains the expected data representative of the respective fiducial.

10. The method of claim 9, wherein the plurality of sensors are mounted on a vehicle traveling along a path, and
wherein the fiducials are positioned at predetermined locations relative to the path of the vehicle such that the data sets are captured by the plurality of sensors.

11. The method of claim 9, wherein the respective fiducial is a cylindrical fiducial or a spherical fiducial.

12. The method of claim 9, wherein the respective fiducial is coated or covered with a reflective coating.

13. The method of claim 9, further comprising rotating the respective fiducial to generate a Doppler effect on a reflected signal, wherein a wavelength of the reflected signal increases as a portion of the respective fiducial that that the signal is reflecting off of is moving towards the respective sensor, and decreases as the portion of the respective fiducial which the signal is reflecting off of is moving away from the respective sensor.

14. The method of claim 13, wherein the reflected signal includes multiple portions with different wavelengths.

15. The method of claim 9, wherein at least one of the plurality of sensors is a camera that captures an image, wherein the plurality of sensors analyze the image to determine whether the image includes data indicating expected intensity values associated with one or more colors of the respective fiducial.

16. The method of claim 15, wherein images captured by two or more of the plurality of sensors are compared to determine if a distance between the sensors and the respective fiducials is the same.

17. A method of calibrating or validating a plurality of sensors by using a plurality of fiducials, the method comprising:
transmitting, by the plurality of sensors, a plurality of signals to the plurality of fiducials;
capturing, by the plurality of sensors, a plurality of images transmitted by the plurality of sensors in response to the plurality of signals,
wherein the images include a plurality of data sets that correspond to respective fiducials of the plurality of fiducials, the plurality of sensors are mounted on a vehicle traveling along a path, and the fiducials are positioned at predetermined locations relative to the path of the vehicle such that the data sets are captured by the plurality of sensors;
determining, by the plurality of sensors, whether data in each of the plurality of data sets contains expected data representative of a respective fiducial of the plurality of fiducials; and
outputting, by each of the respective sensors, a calibration status or a validation status associated with each data set that contains the expected data representative of the respective fiducial.

18. The method of claim 17, wherein the respective fiducial is a cylindrical fiducial or a spherical fiducial.

19. The method of claim 17, wherein the respective fiducial is coated or covered with a reflective coating.

20. The method of claim 17, further comprising rotating the respective fiducial to generate a Doppler effect on a reflected signal, wherein a wavelength of the reflected signal increases as a portion of the respective fiducial that that the signal is reflecting off of is moving towards the respective sensor, and decreases as the portion of the respective fiducial which the signal is reflecting off of is moving away from the respective sensor.

* * * * *